United States Patent [19]

Jones et al.

[11] 3,950,120

[45] Apr. 13, 1976

[54] PELLETISING MACHINES

[75] Inventors: Herbert Jones, Churchdown; Michael Thomas Dorn, Hardwick, both of England

[73] Assignee: Simon-Barron Limited, England

[22] Filed: Nov. 22, 1974

[21] Appl. No.: 526,242

[30] Foreign Application Priority Data

Dec. 21, 1973 United Kingdom............... 59594/73

[52] U.S. Cl. ............................................. 425/314

[51] Int. Cl.[2] ......................................... B29C 17/14

[58] Field of Search...................... 425/310, 314, 331

[56] References Cited

UNITED STATES PATENTS

| | | | |
|---|---|---|---|
| 2,887,718 | 5/1959 | Curran et al. | 425/314 X |
| 3,010,150 | 11/1961 | Meakin | 425/331 |
| 3,108,055 | 10/1963 | Grant | 425/314 X |
| 3,280,426 | 10/1966 | Meakin | 425/314 X |

*Primary Examiner*—Al Lawrence Smith
*Assistant Examiner*—James G. Smith
*Attorney, Agent, or Firm*—Norris & Bateman

[57] ABSTRACT

A pelletising machine of the kind comprising an annular die having radial bores therethrough, and adapted to be rotated about its central axis, whereby material introduced into the centre of the die is extruded through the bores by the action of freely rotatable pelletising rollers which are closely spaced from the inner peripheral surface of the annular die, and having a door which can be hinged between an open position enclosing the die, there being a cut-off knife mounted on the end of a shaft extending through the wall of said door, characterised in that the shaft supporting the cut-off knife passes through a guide sleeve carried in a housing secured to the wall of the door, there being means to permit fine adjustment of the position of said shaft axially within said guide sleeve and means permitting said guide sleeve together with said shaft to be moved as a unit rapidly outwardly relative to said housing and returned inwardly to their initial position.

11 Claims, 4 Drawing Figures

PELLETISING MACHINES

This invention concerns a pelletising machine of the kind (hereinafter termed of the kind referred to) comprising an annular die having radial bores therethrough, and adapted to be rotated about its central axis, whereby material introduced into the centre of the die is extruded through the bores by the action of freely rotatable pelletising rollers which are closely spaced from the inner peripheral surface of the annular die, and having a door which can be hinged between an open position giving access to the die and a closed position enclosing the die, there being a cut-off knife mounted on the end of a shaft extending through the wall of said door.

It will be understood that when a pelletising machine of the kind referred to is in operation, the material which is extruded through the bores of the die forms pellets which grow in length as the die rotates. The cut-off knife extends across the width of the die in spaced relationship therefrom such that the pellets are broken at their roots from the outer surface of the die, when they have grown sufficiently to reach the cut-off knife, it being understood that the spacing between the outer peripheral surface of the die and the cut-off knife is adjustable to equal the length of pellet desired.

It will be understood that the cut-off knife must be moved away from close proximity with the die before the door can be opened.

It is therefore an object of the present invention to provide support means for the shaft carrying the cut-off knife which permits both fine adjustment of the knife position, and which also permits rapid withdrawal of the knife from close proximity with the die and rapid return of the knife to its exact previous working position.

According to the present invention, a pelletising machine of the kind referred to is characterised in that the shaft supporting the cutoff knife passes through a guide sleeve carried in a housing secured to the wall of the door, there being means to permit fine adjustment of the position of said shaft axially within said guide sleeve and means permitting said guide sleeve, together with said shaft to be moved rapidly outwardly relative to said housing, and returned inwardly to their initial position.

The invention will be further apparent from the following description with reference to the several figures of the accompanying drawings which show, by way of example only, one form of pelletising machine embodying the invention.

Figure 2:
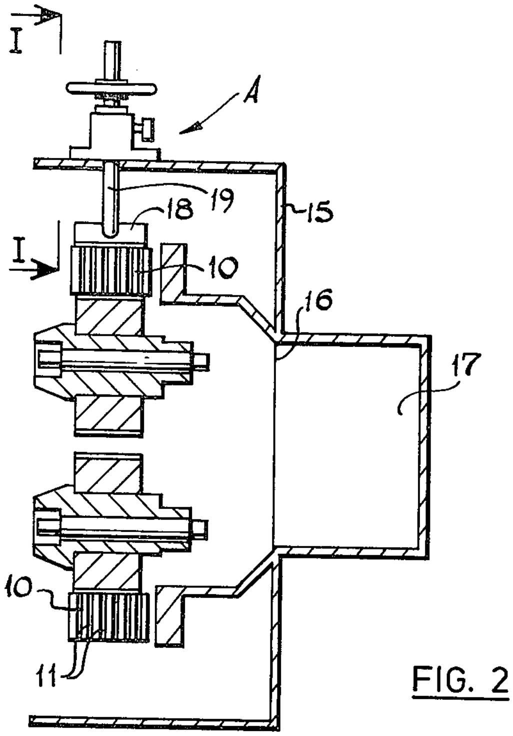
FIG. 2 shows a diagrammatic cross-section through the pelletising machine on the line II—II of FIG. 1.
Figure 1:
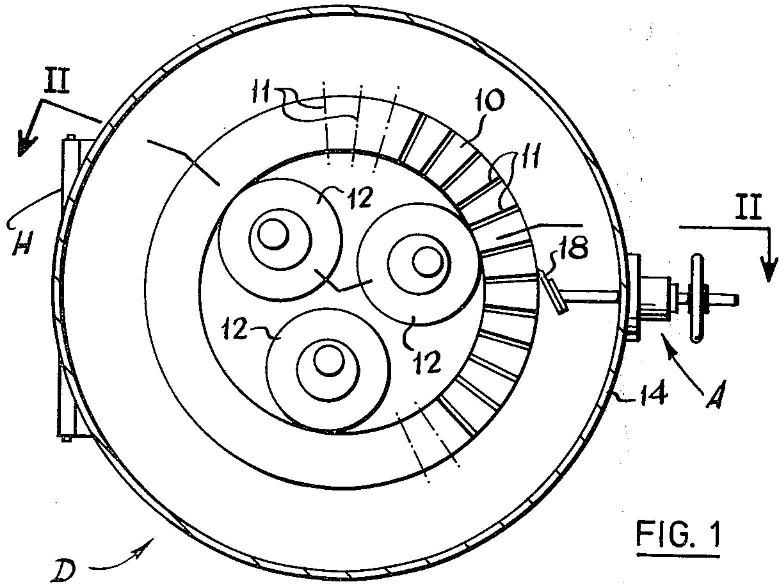
FIG. 1 shows a diagrammatic cross-section through the pelletising machine on the line I—I of FIG. 2.

Referring now to the drawings, and more particularly FIGS. 1 and 2 thereof, it will be seen that the pelletising machine comprises, in known manner, an annular die 10 having a multiplicity of radial bores 11 extending therethrough, which is adapted to be rotated by motor means (not shown) about its central axis. Also in known manner, a number of pelletising rollers 12, each freely rotatable about a fixed stub axle 13, are provided and are closely spaced from the inner peripheral surface of the annular die 10. A door generally indicated at D is provided, and comprises a cylindrical part 14 adapted, when the door is closed, to surround the outer peripheral surface of the die 10 in spaced relationship therefrom, and a front portion 15 having an aperture 16 therein which may be engaged by a chute 17 for the purpose of supplying material to be pelletised to the interior of the annular die 10. The door D is adapted for opening and closing by movement about an hinged axis indicated at H.

A knife 18 is provided and extends over the width of the die 10 in spaced relationship from the outer peripheral surface thereof, and is supported on a shaft 19 which extends through an aperture in the wall portion 14 of the door D where it is clamped in an assembly generally indicated at A.

In operation, material to be pelletised is fed into the interior of the die 10 by means of the chute 17 and is forced through the radial bores 11 as the die 10 is rotated by the action of the pelletising rollers 12. In this way, pellets of extruded material grow from the outer peripheral surface of the die and continue to grow in length until their outer ends engage with the knife 18, when they are broken at their roots to fall free from the die 10 for collection.

It will be understood that when pellets of short length are required, the knife 18 is located close to the outer peripheral surface of the die 10, and that the knife would foul the die on opening the door unless first retracted.

Figure 3:
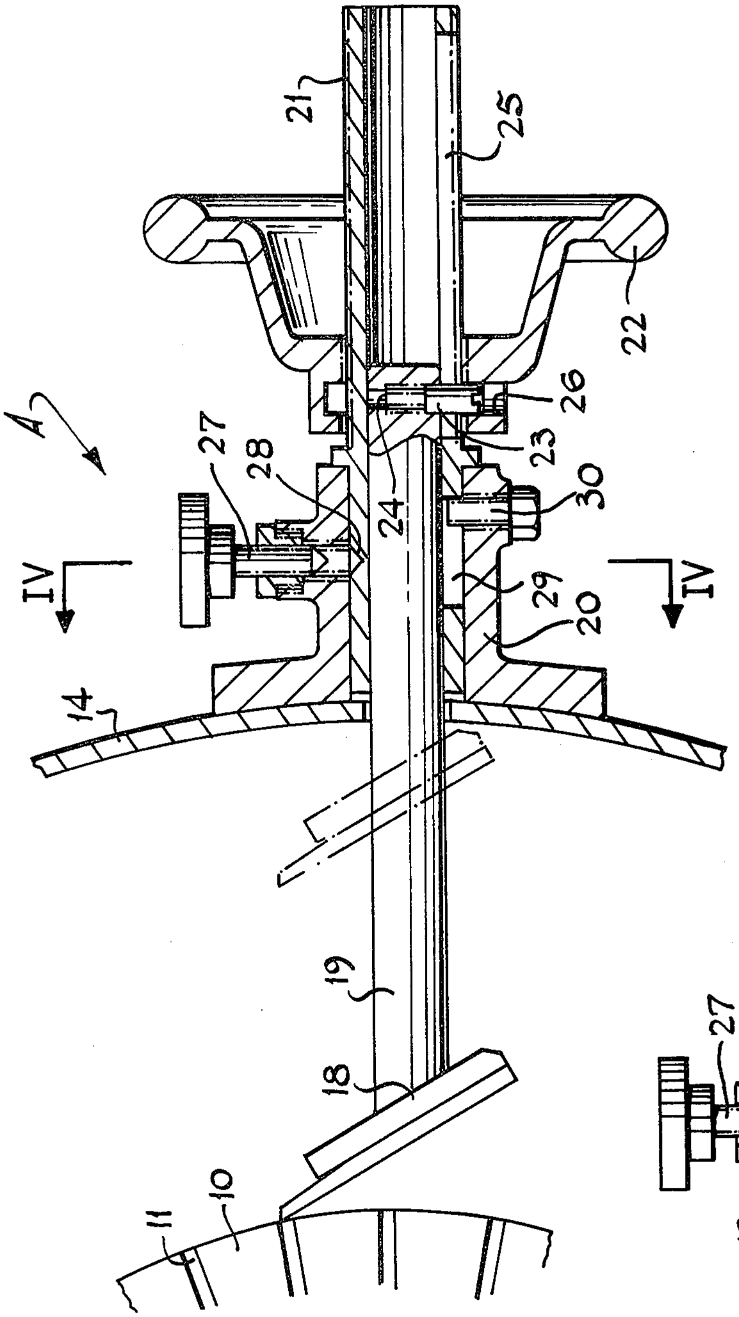
FIG. 3 shows a detailed partially-sectioned view of the knife support arrangements of FIGS. 1 and 2.
Figure 4:
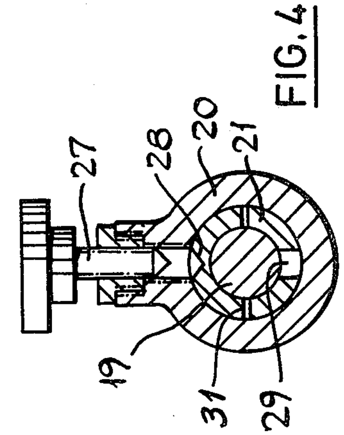
FIG. 4 is a section substantially on line IV—IV in FIG. 3 showing detail of the released locking connection between the guide sleeve and shaft.

Referring now to FIGS. 3 and 4, it will be seen that the assembly A essentially comprises a housing 20 which is secured to the wall portion 14 of the door D and which has a bore passing therethrough, in which is located a guide sleeve 21. The shaft 19 which carries the knife 18 is slidably located within the guide sleeve 21. The external surface of the outer part of the length of the guide sleeve 21 is screw-threaded and threadedly engaged by a handwheel 22 which can be moved along the length of the threaded part of the guide sleeve 21 in either direction by manual rotation. A pin 23 is located in a bore 24 passing through the shaft 19 at a position adjacent the outer end thereof and passes through a slot 25 which extends in an axial direction along the majority of the length of the screw-threaded portion of the guide sleeve 21, to have its outer end located in an annular channel 26 formed in the handwheel 22. It will thus be understood that as the handwheel 22 is rotated, the pin 23, and hence the shaft 19, is constrained to move axially outwardly or inwardly with the handwheel. In this way, the position of the knife 18 relative to the die may be accurately set.

The inner portion of the guide sleeve 21 located within the housing 20 is provided with axially extending slits 31 in its side wall, whereby it is deformable and can be clamped against the shaft 19 by means of a locking screw 27 passing through housing 20. The inner end of the locking screw 27 is adapted to engage a blind bore 28 in the outer wall of the sleeve 21 to fix sleeve 21 against axial shift in the housing 20. An axially extending slot 29 is provided over part of the length of the sleeve 21 and a stop screw 30 passing through the housing 20 has its end located in the slot 29.

By releasing the locking screw 27 so that the end thereof is withdrawn from the bore 28, the entire assembly of handwheel 22, guide sleeve 21, shaft 19 and knife 18 may be drawn slidably outwardly as a unit relative to the housing 20 to ensure that the knife 18 is sufficiently widely spaced from the die 10 to enable the door D to be opened. Outward movement of the assembly just mentioned is limited by engagement of the stop screw 30 with the inner end of the slot 29. When the door is closed, the knife may be returned to its original position by moving the assembly inwardly to the limit permitted by pin 30 and then tightening the locking screw 27 to again fix sleeve 21 axially in housing 20.

When it is desired to make a fine adjustment to the position of the knife 18, as when the knife is in approximately correct position relative to the die, the locking screw 27 must be loosened sufficiently to break the clamped connection between the deformable part of sleeve 21 and the shaft 19, but not sufficiently as to permit axial outward movement of the guide sleeve 21 from its innermost position within the housing 20.

It will be appreciated that it is not intended to limit the invention to the above example only, many variations, such as might readily occur to one skilled in the art, being possible without departing from the scope thereof, as defined by the appended claims.

What is claimed is:

1. A pelletising machine comprising a rotatably mounted annular die having radial bores, means for extruding material introduced into the interior of the die outwardly through said bores, a door mounted for movement between a closed position during machine operation and an open position providing access to the die, a housing on said door, a guide sleeve axially slidably mounted on said housing, a shaft axially slidably mounted in said guide sleeve and extending through an opening in the door, a cut-off knife mounted on the shaft adapted to be disposed adjacent the outer periphery of said die when the door is closed for breaking off the extrusions into pellets of predetermined length, means providing axial ajustment of said shaft within said guide sleeve for accurately locating said knife in a set pellet forming position relative to the outer periphery of said die when the door is closed, and releasable locking means interconnecting said housing and guide sleeve during normal operation of said machine, release of said locking means permitting movement of said shaft and guide sleeve as a unit together on said housing for displacing said knife rapidly between said set position and an outer position permitting the door to be opened while not disturbing said adjustment of the shaft relative to the guide sleeve.

2. The pelletising machine defined in claim 1, including cooperating stop means on said housing and sleeve limiting the extent of axial movement of said sleeve relative to said housing.

3. A pelletising machine according to claim 1, including a rotatable handwheel threadedly connected to said guide sleeve for movement axially therealong in either direction, and means connecting said shaft to said handwheel whereby axial movement of said handwheel effects said axial adjustment of said shaft in said sleeve.

4. A pelletising machine according to claim 3, wherein said guide sleeve is provided with a slot extending axially thereof, and there being a fixed pin extending outwardly from said shaft and passing through said slot to be located in an annular channel in said handwheel whereby axial movement of the handwheel causes axial movement of said pin in said slot, and hence axial movement of said shaft.

5. A pelletising machine according to claim 3, wherein the portion of said guide sleeve within the housing is provided with axially extending slits whereby it is deformable and can be clamped against the shaft by means of a locking screw passing through the housing.

6. A pelletising machine according to claim 4, wherein the portion of said guide sleeve within the housing is provided with axially extending slits whereby it it deformable and can be clamped against the shaft by means of a locking screw passing through the housing.

7. A pelletising machine according to claim 5, wherein said locking screw is mounted on said housing and adapted to engage a glind bore in the guide sleeve whereby to secure the guide sleeve against axial movement when the door is closed.

8. A pelletising machine according to claim 6, wherein said locking screw is mounted on said housing and adapted to engage a blind bore in the guide sleeve whereby to secure the guide sleeve against axial movement when the door is closed.

9. A pelletising machine according to claim 7, wherein a further slot extends axially in the portion of said guide sleeve within the housing to receive a stop element extending inwardly from said housing whereby when said locking screw is released said guide sleeve and shaft may be moved together outwardly relative to the housing until said stop element engages the end of the slot in which it is located.

10. A pelletising machine according to claim 8, wherein a further slot extends axially in the portion of said guide sleeve within the housing to receive a stop element extending inwardly from said housing whereby when said locking screw is released said guide sleeve and shaft may be moved together outwardly relative to the housing until said stop element engages the end of the slot in which it is located.

11. A pelletising machine as defined in claim 1, wherein the portion of the guide sleeve within the housing is axially split so as to be deformable and a radially directed locking screw on said housing is adjustable between positions where it serves as said releasable locking means between the sleeve and the housing and another position where it deforms said guide sleeve to clamp the sleeve to said housing.

* * * * *